(No Model.) 2 Sheets—Sheet 1.
J. F. MURPHY.
TRIMMER FOR SEWING MACHINES.
No. 453,429. Patented June 2, 1891.
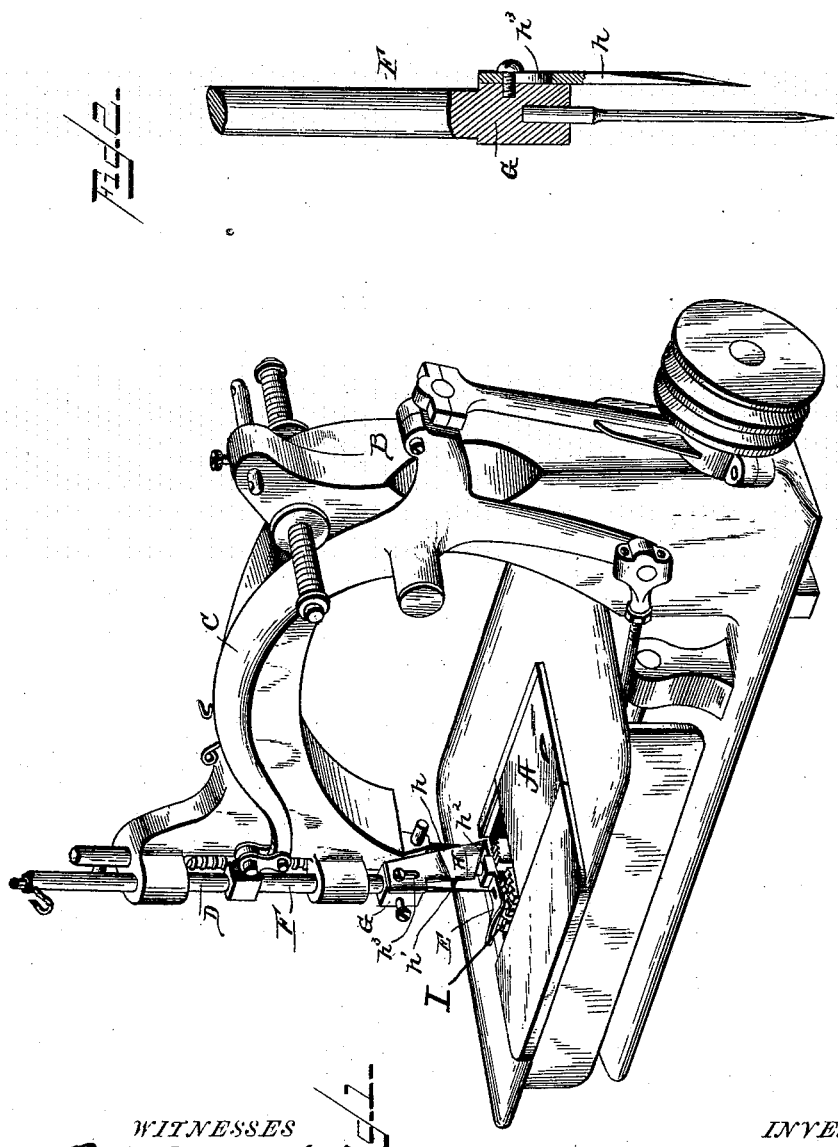
WITNESSES
INVENTOR (No Model.) 2 Sheets—Sheet 2.
J. F. MURPHY.
TRIMMER FOR SEWING MACHINES.
No. 453,429. Patented June 2, 1891.
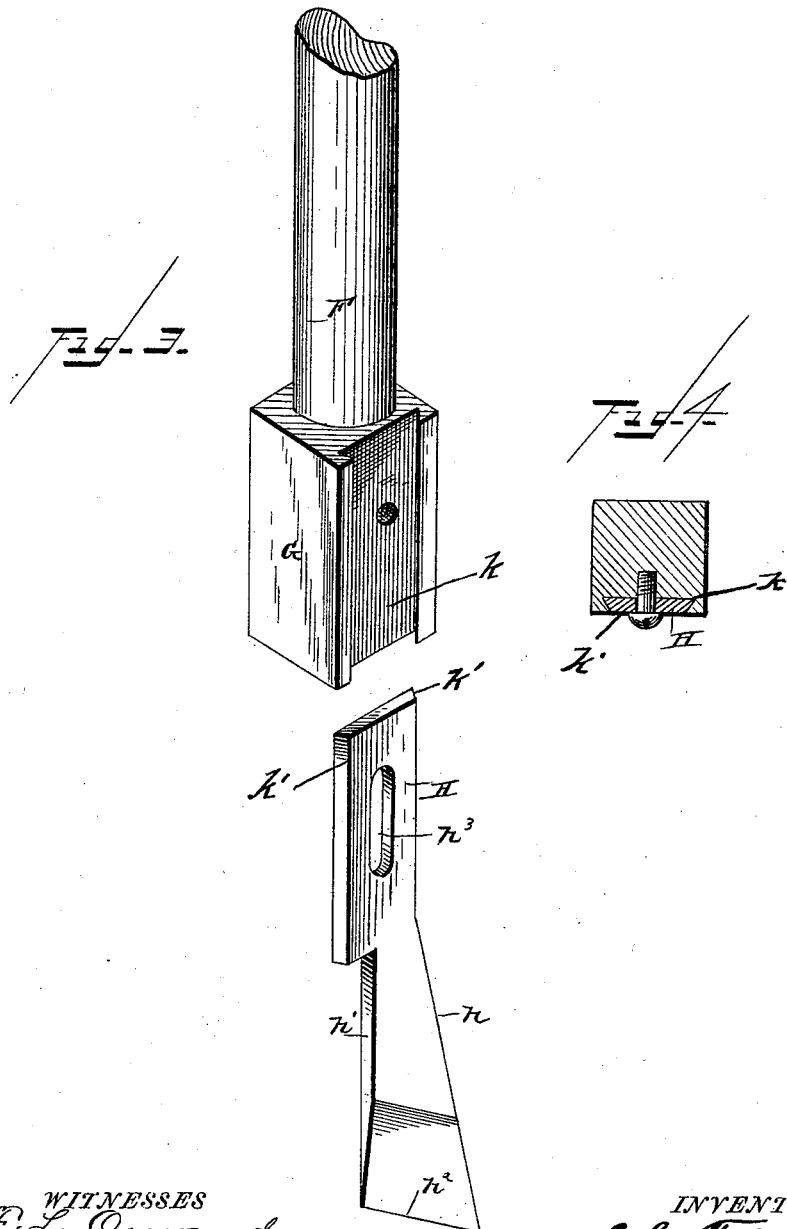
WITNESSES
F. L. Ourand
Bennett S. Jones
INVENTOR
John F. Murphy
by Wm A. Moore
Attorney

UNITED STATES PATENT OFFICE.

JOHN F. MURPHY, OF LITTLE FALLS, NEW YORK.

TRIMMER FOR SEWING-MACHINES.

SPECIFICATION forming part of Letters Patent No. 453,429, dated June 2, 1891.

Application filed June 11, 1889. Renewed April 24, 1891. Serial No. 390,312. (No model.)

*To all whom it may concern:*

Be it known that I, JOHN F. MURPHY, a citizen of the United States, residing at Little Falls, in the county of Herkimer and State of New York, have invented certain new and useful Improvements in Trimmers for Sewing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in trimmers for sewing-machines; and the leading object of the invention is the provision of a trimmer which will be superior to others in simplicity, inexpensiveness, and general efficiency.

A further object is the provision of a trimmer which may be applied to all sewing-machines, and which will operate with ease and efficiency.

A further object is the provision of a trimmer which may be affixed in position or detached readily, and which may be thrown out of operation when not desired to employ said trimmer.

To attain the desired objects, the invention consists of the trimmer illustrated, described, and specifically claimed herein.

Figure 1 represents a perspective view of a sewing-machine with my improved trimmer in position thereon. Fig. 2 represents a perspective view of the needle-bar and trimmer on an enlarged scale. Fig. 3 represents a perspective view of the needle-bar and trimmer, and the adjusting devices for throwing or moving the trimmer out of operative position. Fig. 4 represents a sectional view thereof.

Referring by letter to the drawings, A designates the cloth-plate of a sewing-machine; B, the curved upright; C, the vibrating lever; D, the spring presser-bar; E, the presser-foot, and F the needle-bar connected to the vibrating lever. The needle-bar is formed with an enlargement or hub G at its lower end, in which the needle is received, and on the inner side of said enlargement is secured the trimmer, blade, or cutter H.

The trimmer is of peculiar construction, having its rear edge $h$ inclined considerably, and its front edge $h'$ inclined slightly and shorter than the rear edge, thus producing a broad knife-edge $h^2$, which is arranged sufficiently in rear of the needle, and is of the proper construction to trim the edges of the material with a shear or clean cut. The trimmer is also formed with a slot $h^3$ for adjusting the same to the work.

The operation of my improved trimmer will be readily understood from the foregoing description, taken in connection with the drawings, and may be briefly stated as follows: The material to be sewed and trimmed is placed under the presser-foot, the needle-bar reciprocates, carrying the needle through the material, effecting the sewing thereof and leaving the rough edge on the material. The material after being sewed passes under the trimmer, the same descending and cutting the rough edge from the material.

I have illustrated in Figs. 3 and 4 an adjusting device for the trimmer, by means of which it may be thrown out of operative position, and in this case the enlargement G is formed with a dovetailed channel K, and the upper end of the blade is beveled on each side at $k'$ to fit in said channel.

The side edges $h$ $h'$ of the blade of the trimmer diverge downwardly, the inner edge $h$ having a greater inclination from the perpendicular than the outer edge $h'$. This gives greater width to the cutting-edge $h^2$, which is beveled outwardly or toward the needle-bar, and is inclined downward in the direction in which the feed mechanism or block moves in order that it will shear the edge of the advancing cloth. The edge $h^2$ is straight, so that the inclination of shear will be the same at all times.

I designates the toothed feed-block, which coacts with the trimmer-blade, the latter passing down almost in contact with its inner side, the block forming what is essentially the lower shear. The feed-block is reciprocated by mechanism of ordinary construction operated from the vibrating lever C.

Having described my invention, what I claim as new, and desire to secure by Letters Patent, is—

1. The combination, with the vertically-reciprocating needle-bar and the horizontally-reciprocating feed-block, of the trimmer attached to and moving with the needle-bar and provided with a straight cutting-edge inclined downward in the direction in which the cloth moves with the feed-block, said trimmer being beveled on one side, its opposite flat side shearing against the adjacent flat side of the said feed-block, substantially as specified.

2. The combination, with the needle-bar having the rectangular enlargement at its lower end provided with the channel or recess on its inner side having interior dovetailed vertical edges, of the trimmer-blade provided with the vertical dovetailed edges to engage in said channel or recess and adjustable in said channel or recess, having the downwardly-diverging edges and the straight cutting-edge beveled toward the feed-block and inclined downward in the direction in which the cloth moves, and the horizontally-reciprocating feed-block coacting with the straight beveled cutting-edge of the trimmer, substantially as specified.

In testimony whereof I affix my signature in presence of two witnesses.

JOHN F. MURPHY.

Witnesses:
　E. J. COFFIN,
　GEORGE H. BURROWS.